US012736126B2

(12) United States Patent
Campton et al.

(10) Patent No.: US 12,736,126 B2
(45) Date of Patent: Sep. 15, 2026

(54) ELECTRIC VEHICLE TRANSMISSION

(71) Applicant: BorgWarner Inc., Auburn Hills, MI (US)

(72) Inventors: Calahan B. Campton, Fremont, CA (US); James Bourn, Oxford, MI (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 18/859,748

(22) PCT Filed: May 16, 2023

(86) PCT No.: PCT/US2023/022336
§ 371 (c)(1),
(2) Date: Oct. 24, 2024

(87) PCT Pub. No.: WO2023/224958
PCT Pub. Date: Nov. 23, 2023

(65) Prior Publication Data
US 2025/0277523 A1 Sep. 4, 2025

Related U.S. Application Data

(60) Provisional application No. 63/342,738, filed on May 17, 2022.

(51) Int. Cl.
*F16H 57/04* (2010.01)
*H02K 5/20* (2006.01)
(Continued)

(52) U.S. Cl.
CPC ..... *F16H 57/0476* (2013.01); *F16H 57/0424* (2013.01); *F16H 57/0436* (2013.01);
(Continued)

(58) Field of Classification Search
CPC ............... F16H 57/0476; F16H 57/045; B60K 2001/001; B60K 1/00
See application file for complete search history.

(56) References Cited

U.S. PATENT DOCUMENTS 5,643,127 A 7/1997 Yoshii et al.
5,662,188 A * 9/1997 Ito ............................ B62D 5/07 184/6.12

(Continued)

FOREIGN PATENT DOCUMENTS

CN 110259923 A 9/2019
DE 112013007520 B4 6/2021

(Continued)

OTHER PUBLICATIONS

English language abstract and machine-assisted English translation for WO 2021/137287 A1 extracted from espacenet.com database on Jun. 17, 2025, 24 pages.

(Continued)

*Primary Examiner* — Sherry L Estremsky
(74) *Attorney, Agent, or Firm* — Howard & Howard Attorneys PLLC

(57) ABSTRACT

An electric vehicle transmission (30) for a vehicle includes a housing (32) defining a housing interior (34) and an electric motor (40) disposed in the housing interior (34). The electric motor (40) comprises a rotor (42) and a stator (44). The electric vehicle transmission (30) also includes an input shaft (46) disposed in the housing interior (34) and extending along a shaft axis. The input shaft (46) is rotatably coupled to the rotor (42) of the electric motor (40). The electric vehicle transmission (30) further includes a gear reduction assembly (50) disposed in the housing interior (34). The gear reduction assembly (50) is rotatably coupled to the input shaft (46) for delivering rotational torque to wheels of the vehicle. The housing (32) defines a first sump (Continued)

(36) for retaining oil and a second sump (38) separate from the first sump (36) for retaining oil. The second sump (38) and the first sump (36) are configured such that oil lubricates the gear reduction assembly (50) when flowing from the second sump (38) into the first sump (36).

20 Claims, 11 Drawing Sheets

(51) Int. Cl.
*H02K 7/00* (2006.01)
*H02K 7/116* (2006.01)
*H02K 9/19* (2006.01)

(52) U.S. Cl.
CPC .......... *F16H 57/0453* (2013.01); *H02K 5/20* (2013.01); *H02K 7/006* (2013.01); *H02K 7/116* (2013.01); *H02K 9/19* (2013.01)

(56) References Cited

U.S. PATENT DOCUMENTS

| | | | | |
|---|---|---|---|---|
| 7,549,940 | B2 | 6/2009 | Kira et al. | |
| 8,049,384 | B2 * | 11/2011 | Wilton | B60L 3/0061 310/83 |
| 8,459,134 | B2 | 6/2013 | Harashima et al. | |
| 8,746,405 | B2 | 6/2014 | Perakes et al. | |
| 8,968,139 | B2 | 3/2015 | Fukami et al. | |
| 9,410,610 | B1 * | 8/2016 | Pritchard | F16H 57/0457 |
| 9,657,825 | B2 * | 5/2017 | Ohmura | B60K 17/165 |
| 9,958,055 | B2 | 5/2018 | Iwasaki et al. | |
| 10,746,282 | B2 | 8/2020 | Ito et al. | |
| 10,753,449 | B2 | 8/2020 | Yamamoto et al. | |
| 11,114,921 | B2 * | 9/2021 | Ito | F16H 57/045 |
| 11,168,783 | B1 | 11/2021 | Cradit et al. | |
| 11,274,740 | B2 | 3/2022 | Wilson et al. | |
| 11,318,834 | B2 | 5/2022 | Suyama et al. | |
| 11,413,946 | B2 * | 8/2022 | Absenger | F16H 57/045 |
| 11,421,774 | B2 | 8/2022 | Tamura et al. | |
| 11,434,977 | B2 | 9/2022 | Takahashi et al. | |
| 11,578,798 | B2 * | 2/2023 | Nakata | F16H 57/0436 |
| 11,649,882 | B2 * | 5/2023 | Asai | F16H 37/082 475/221 |
| 2021/0190201 | A1 * | 6/2021 | Shimokobe | H02K 9/19 |
| 2021/0293325 | A1 | 9/2021 | Tanaka | |
| 2021/0394600 | A1 | 12/2021 | Absenger et al. | |
| 2022/0099177 | A1 | 3/2022 | Tamura et al. | |
| 2023/0313877 | A1 | 10/2023 | Oshidari | |
| 2024/0229920 | A1 | 7/2024 | Oshidari | |

FOREIGN PATENT DOCUMENTS

| | | | |
|---|---|---|---|
| DE | 102020132211 | B3 | 5/2022 |
| JP | 5905737 | B2 | 4/2016 |
| WO | 2012114847 | A1 | 8/2012 |
| WO | 2015058788 | A1 | 4/2015 |
| WO | 2018061443 | A1 | 4/2018 |
| WO | 2021137287 | A1 | 7/2021 |

OTHER PUBLICATIONS

Partial International Search Report for Application No. PCT/US2023/022335 dated Aug. 11, 2023, 2 pages.
International Search Report for Application No. PCT/US2023/022332 dated Jul. 24, 2023, 3 pages.
International Search Report for Application No. PCT/US2023/022336 dated Jul. 24, 2023, 3 pages.
International Search Report for Application No. PCT/US2023/022335 dated Dec. 12, 2023, 2 pages.
English language abstract and machine-assisted English translation for CN 110259923 A extracted from espacenet.com database on Oct. 22, 2024, 17 pages.
English language abstract for DE 11 2013 007 520 B4 extracted from espacenet.com database on Oct. 22, 2024, 2 pages.
Machine-assisted English language abstract and machine-assisted English translation for DE 10 2020 132 211 B3 extracted from espacenet.com database on Oct. 22, 2024, 18 pages.
English language abstract and machine-assisted English translation for JP 5905737 B2 extracted from espacenet.com database on Oct. 22, 2024, 18 pages.
English language abstract for WO 2018/061443 A1 extracted from espacenet.com database on Oct. 22, 2024, 2 pages.
U.S. Appl. No. 18/858,564, filed Oct. 21, 2024.
U.S. Appl. No. 18/859,774, filed Oct. 24, 2024.

* cited by examiner

ELECTRIC VEHICLE TRANSMISSION

CROSS-REFERENCE TO RELATED APPLICATIONS

This application is the National Stage of International Patent Application No. PCT/US2023/022336, filed May 16, 2023, which claims priority to and all the advantages of U.S. Provisional Patent Application No. 63/342,738, filed May 17, 2022, the entire contents of which are hereby incorporated by reference.

BACKGROUND OF THE DISCLOSURE

1. Field of the Disclosure

The present invention generally relates to an electric vehicle transmission.

2. Description of the Related Art

Conventional electric vehicle transmissions of a vehicle include a housing defining a housing interior and a sump for retaining oil, an electric motor including a rotor and a stator disposed in the housing interior, an input shaft disposed in the housing interior and extending along a shaft axis with the shaft being rotatably coupled to the rotor of the electric motor, and a gear reduction assembly disposed in the housing interior. The gear reduction assembly is rotatably coupled to the input shaft for delivering rotational torque to wheels of the vehicle. Oil is typically distributed throughout the electric vehicle transmission from the sump through the use of at least one pump. However, typical electric vehicle transmission using at least one pump to distribute oil throughout the electric vehicle transmission require the at least one pump to be larger, which occupies space in the vehicle and increases the cost of the electric vehicle assembly.

Accordingly, there remains a need for an improved electric vehicle transmission.

SUMMARY OF THE INVENTION

An electric vehicle transmission for a vehicle includes a housing defining a housing interior and an electric motor disposed in the housing interior. The electric motor comprises a rotor and a stator. The electric vehicle transmission also includes an input shaft disposed in the housing interior and extending along a shaft axis. The input shaft is rotatably coupled to the rotor of the electric motor. The electric vehicle transmission further includes a gear reduction assembly disposed in the housing interior. The gear reduction assembly is rotatably coupled to the input shaft for delivering rotational torque to wheels of the vehicle. The housing defines a first sump for retaining oil and a second sump separate from the first sump for retaining oil. The second sump and the first sump are configured such that oil lubricates the gear reduction assembly when flowing from the second sump into the first sump.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
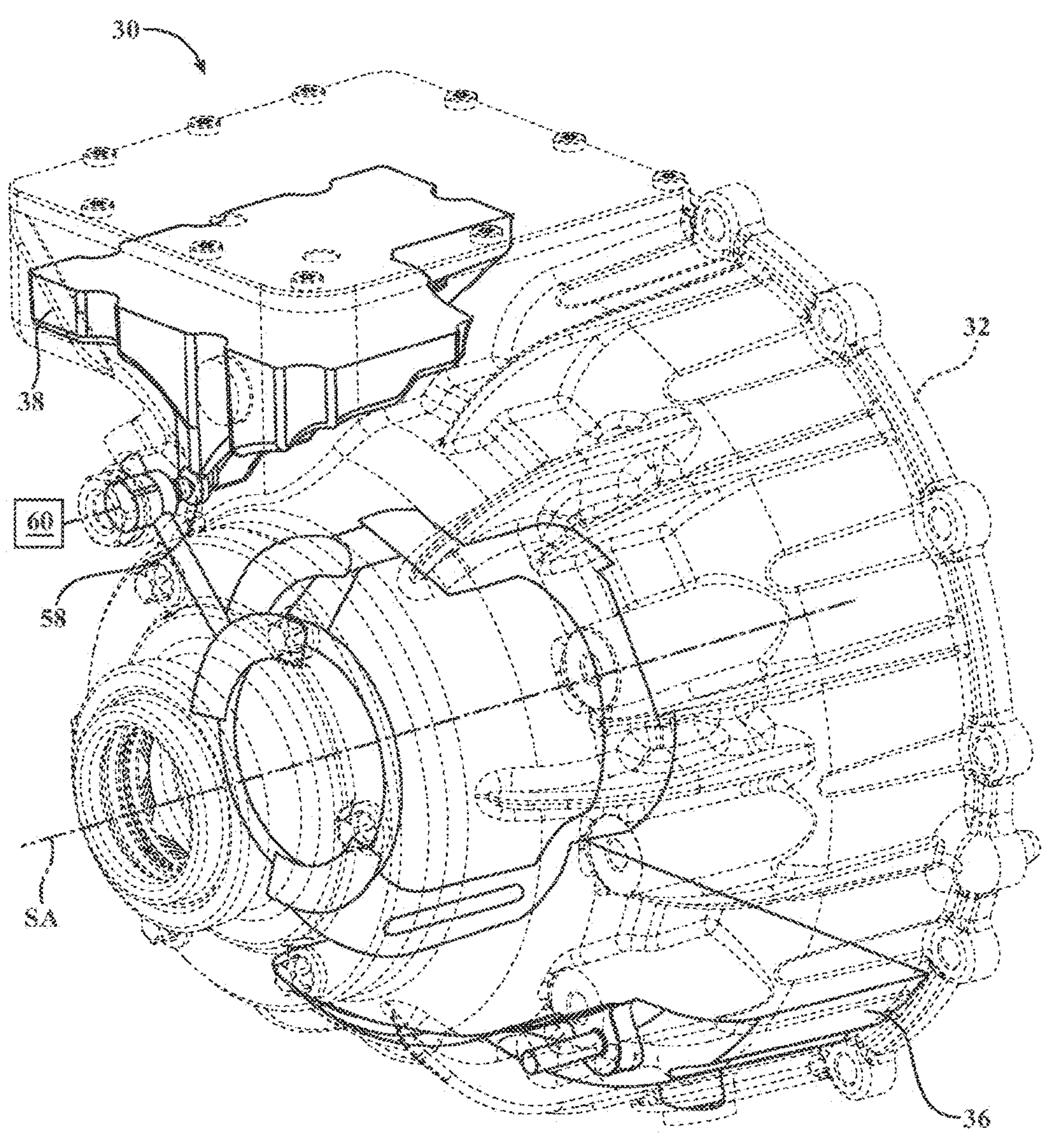
FIG. 1 is a perspective view of an electric vehicle transmission including a housing defining a housing interior.
Figure 2:
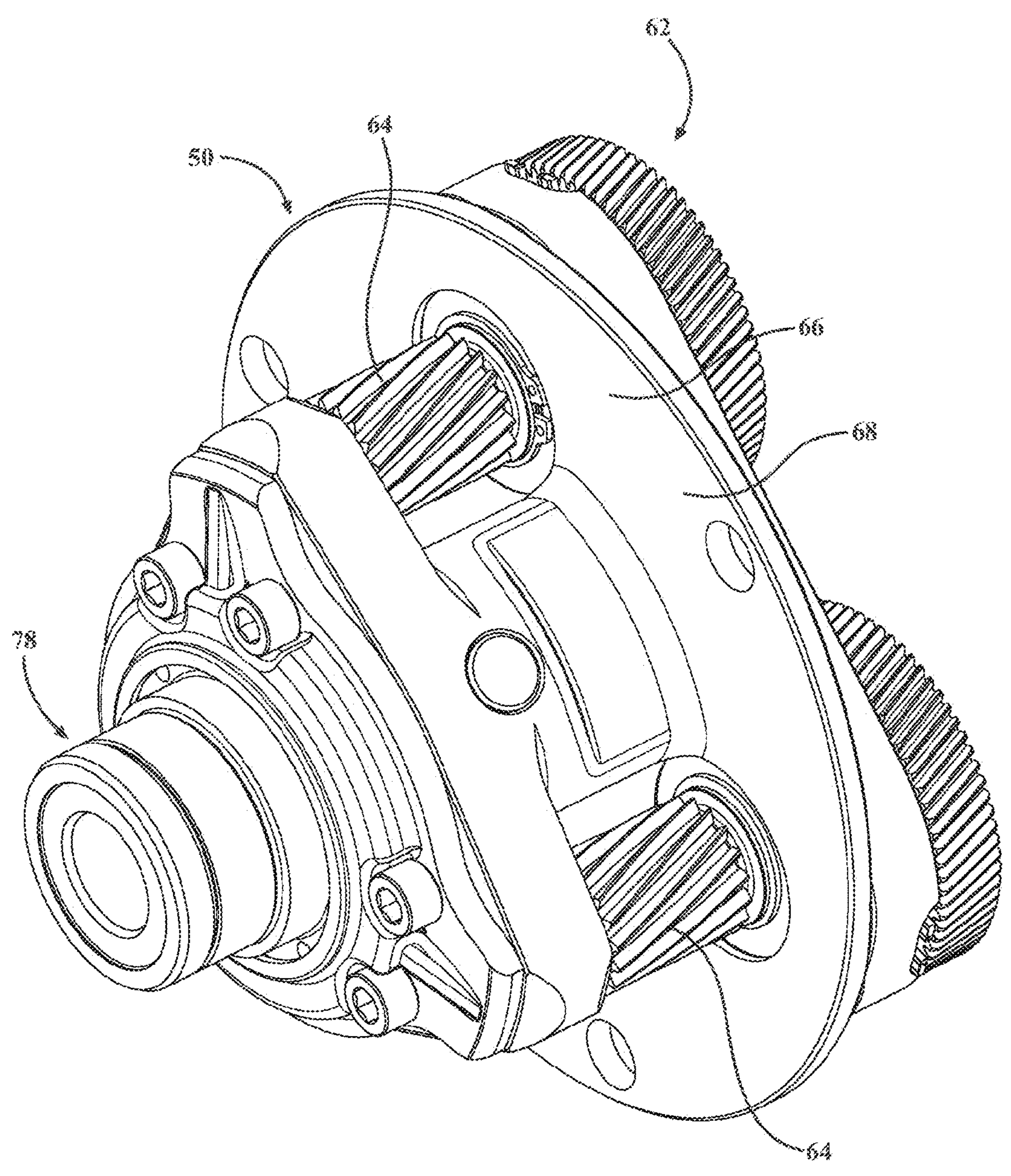
FIG. 2 is a perspective view of a gear reduction assembly.
Figure 3:
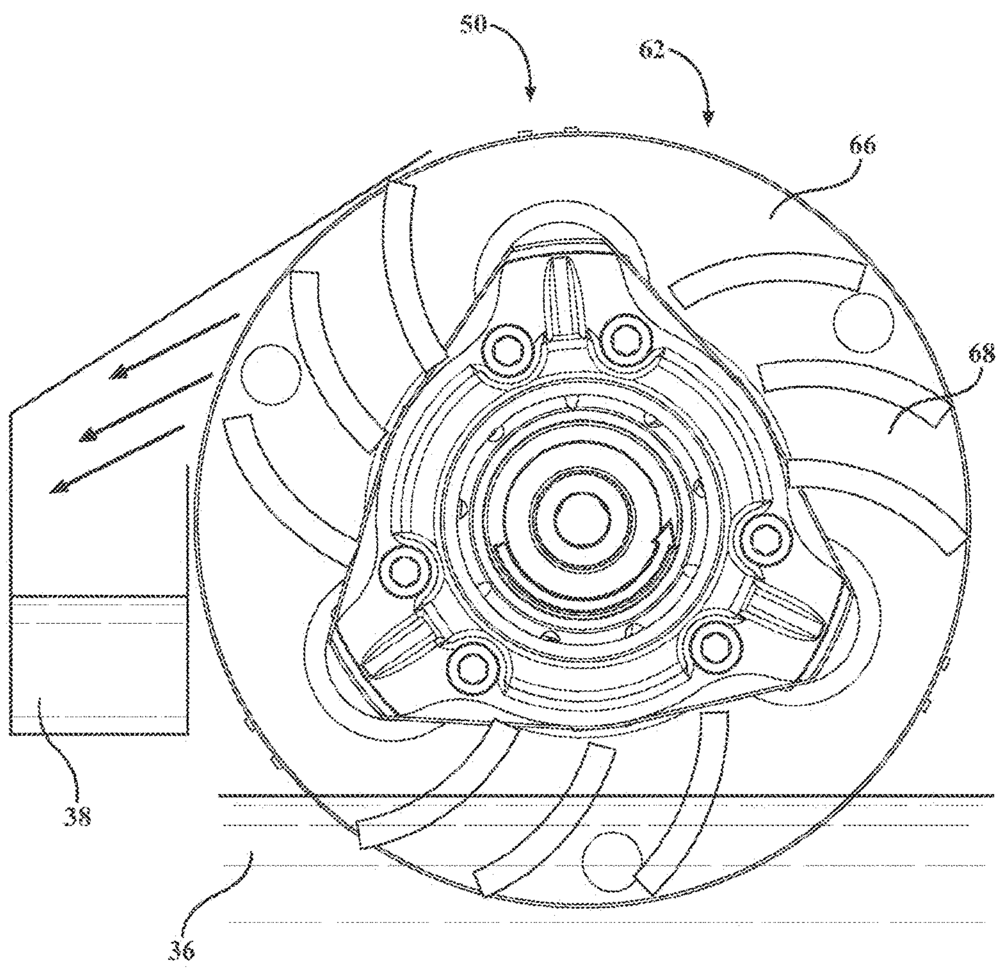
FIG. 3 is a front view of a gear reduction assembly.
Figure 4:
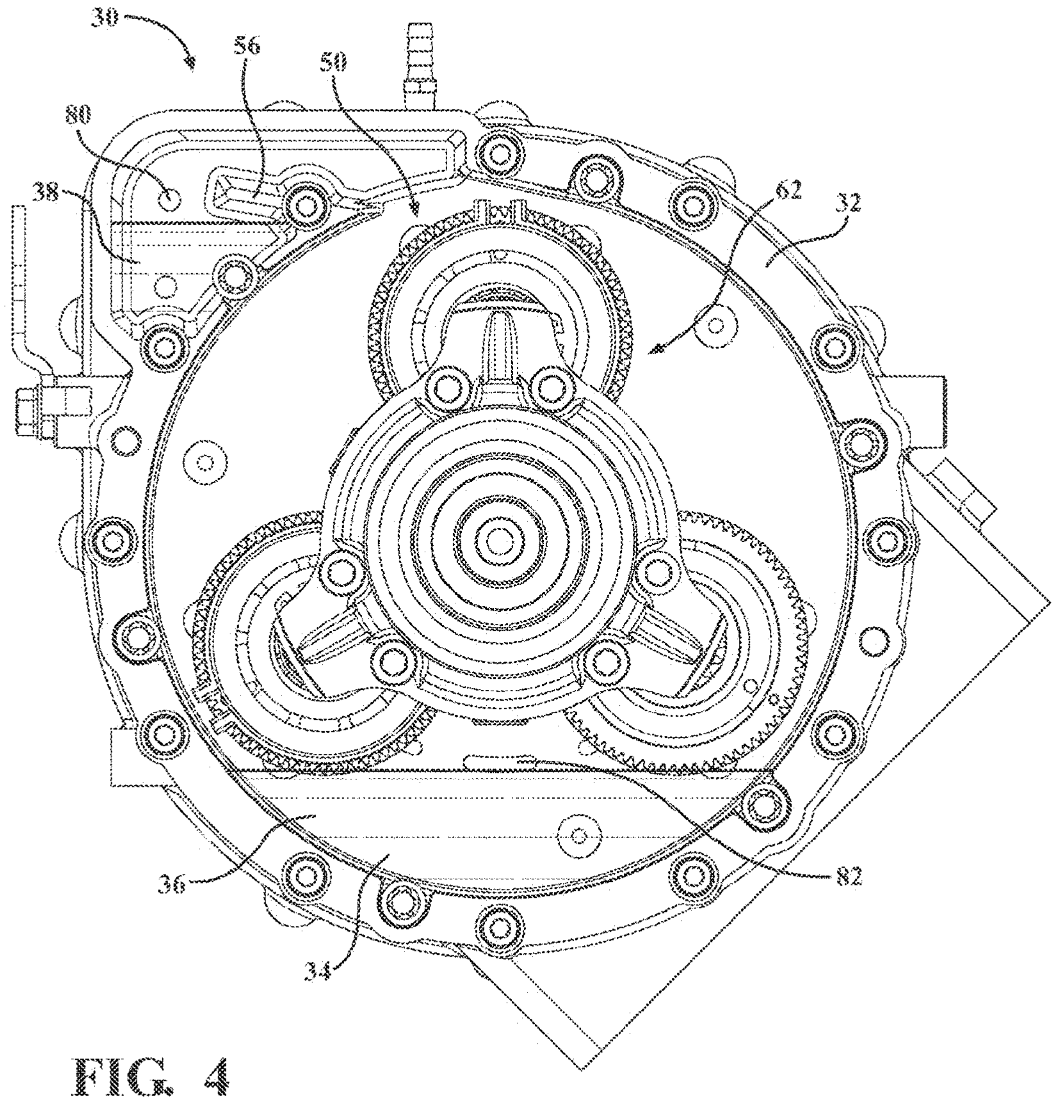
FIG. 4 is a front view of the electric vehicle transmission including a housing defining a first sump and a second sump.
Figure 5:
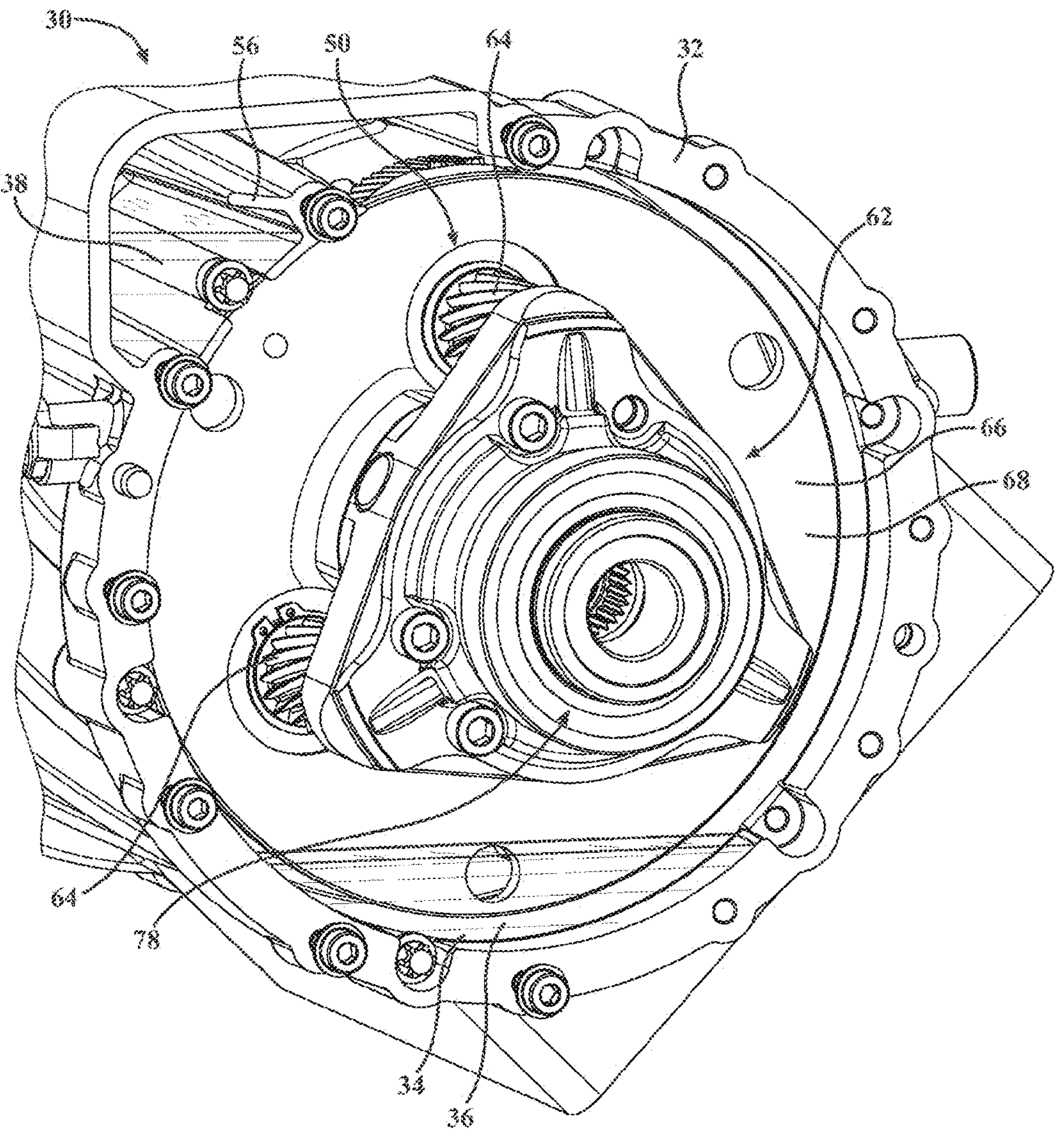
FIG. 5 is a perspective view of the electric vehicle transmission.
Figure 6:
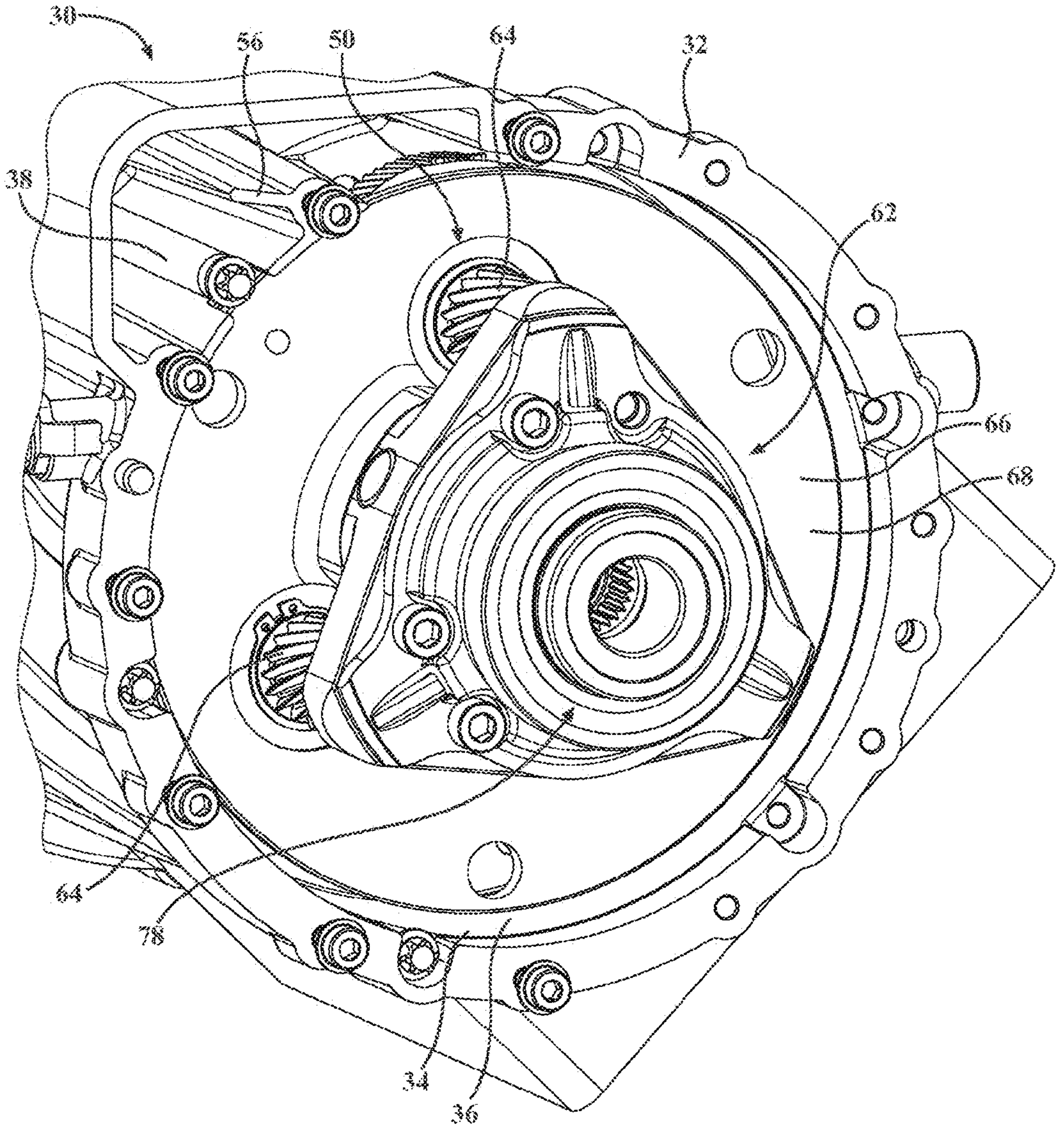
FIG. 6 is a perspective view of the electric vehicle transmission.
Figure 7:
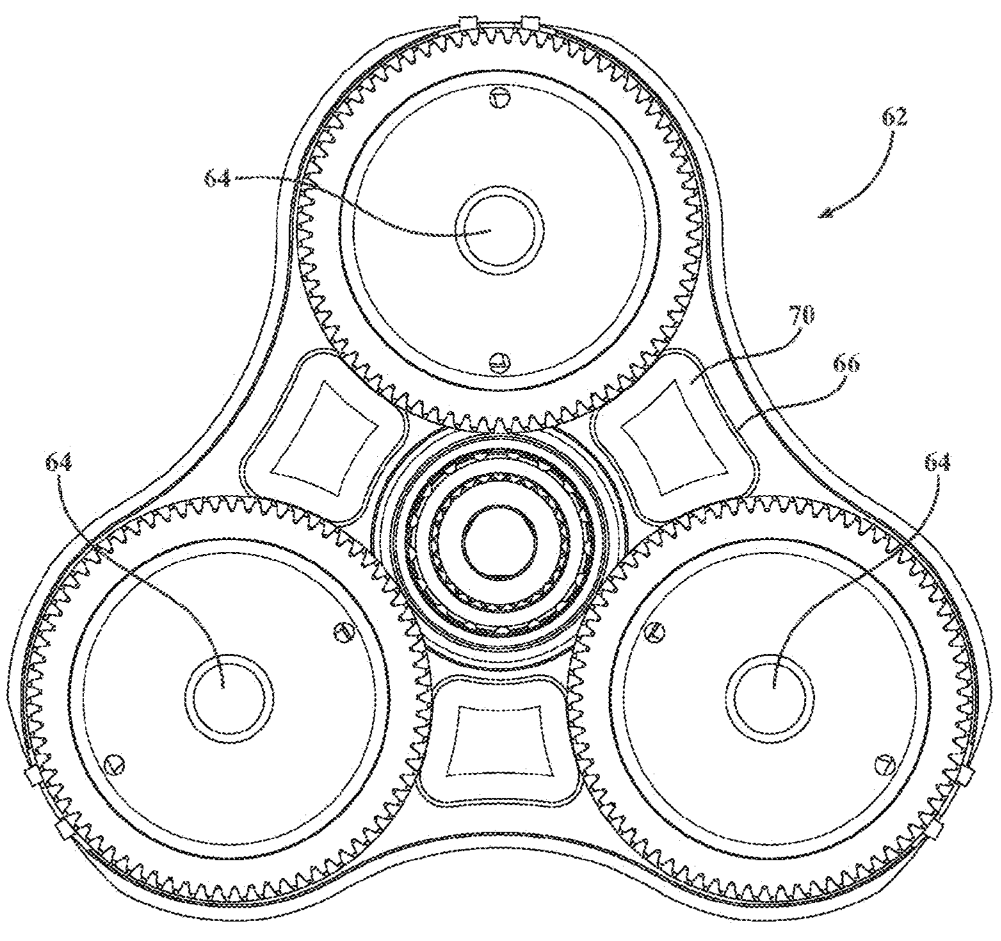
FIG. 7 is front view of a planetary gear set and a carrier of the electric vehicle transmission.
Figure 8:
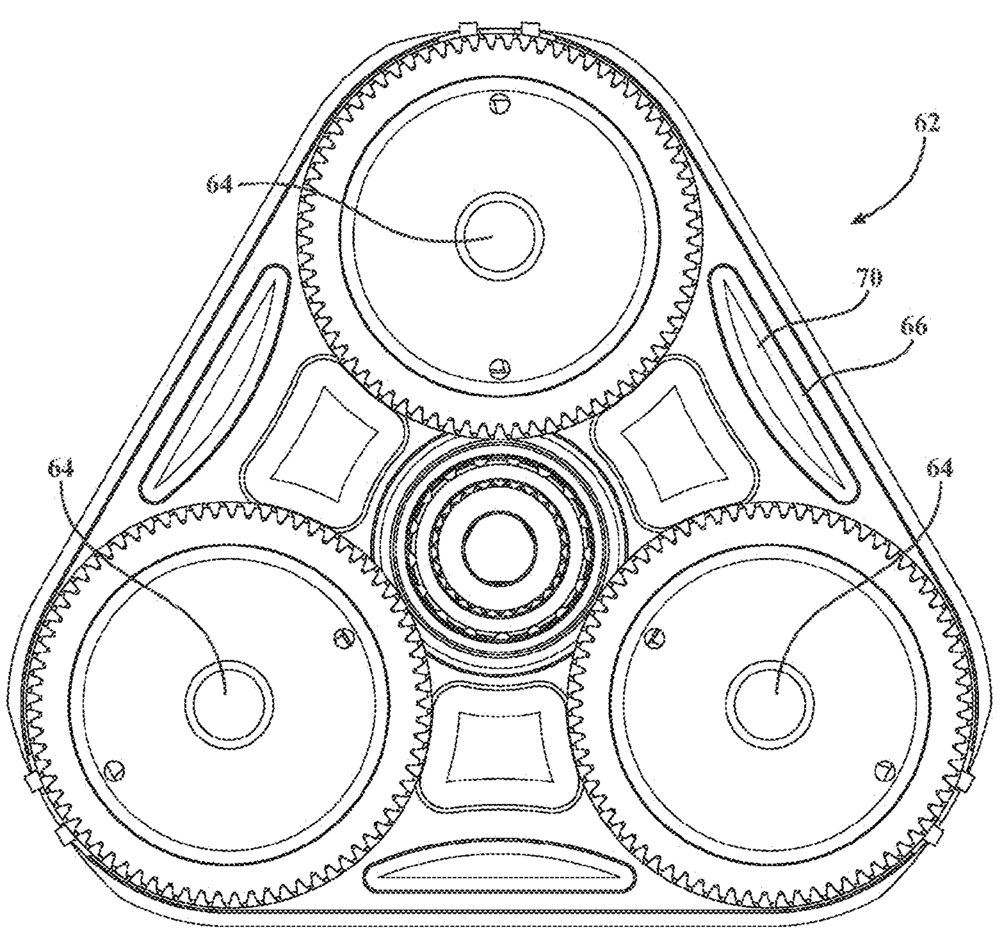
FIG. 8 is front view of a planetary gear set and another embodiment of the carrier of the electric vehicle transmission.
Figure 9:
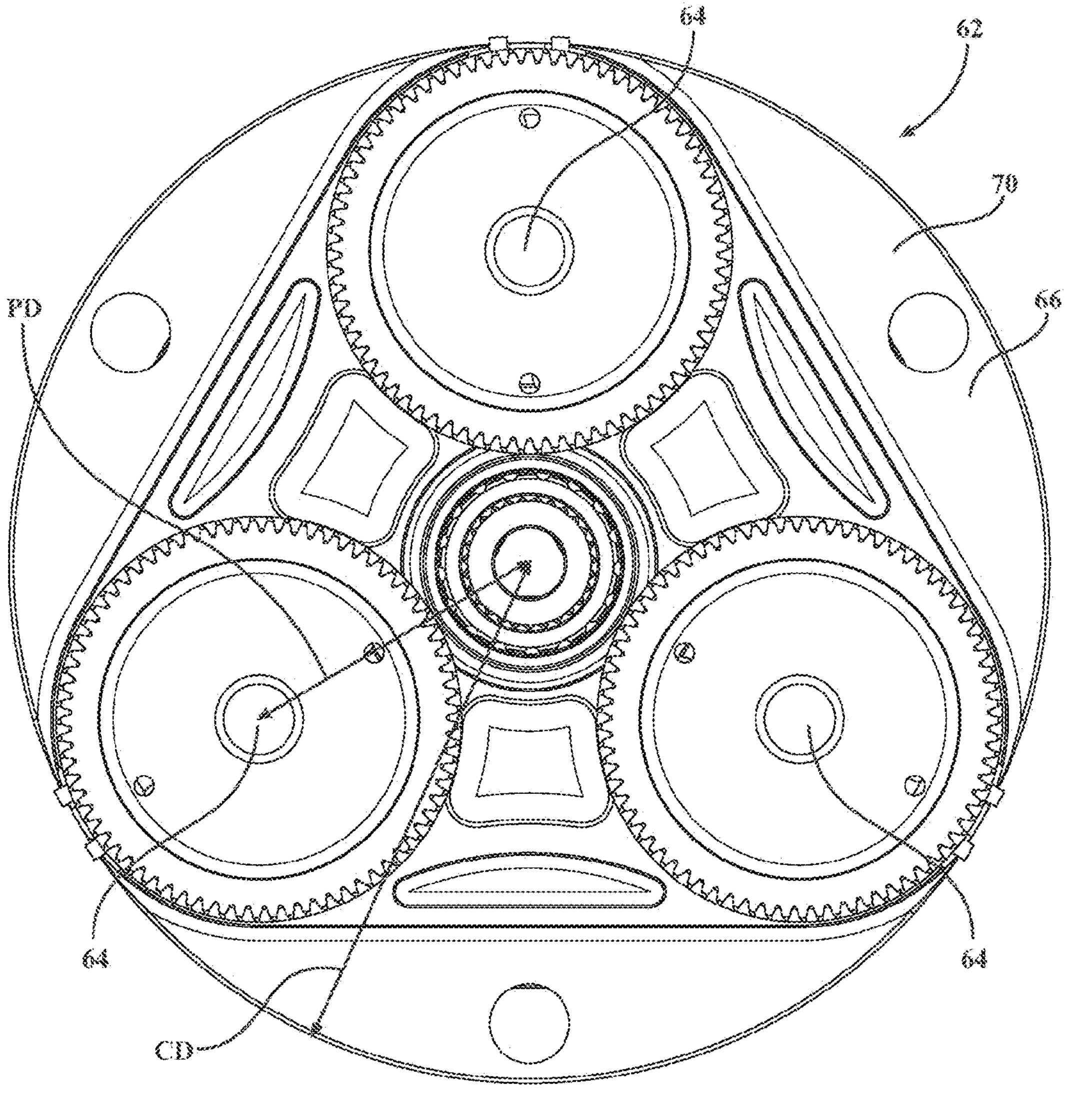
FIG. 9 is front view of a planetary gear set and another embodiment of the carrier of the electric vehicle transmission.

With reference to the Figures, wherein like numerals indicate like parts throughout the several views, an electric vehicle transmission 30 for a vehicle is generally shown in FIGS. 1-11. The electric vehicle transmission 30 includes a housing 32 defining a housing interior 34. The electric vehicle transmission also includes an electric motor 40 disposed in the housing interior 34. The electric motor 40 includes a rotor 42 and a stator 44. The electric vehicle transmission 30 further includes an input shaft 46 disposed in the housing interior 34 and extending along a shaft axis SA. The input shaft 46 is rotatably coupled to the rotor 42 of the electric motor 40. The electric vehicle transmission 30 typically includes a first output shaft 47, and a second output shaft 49. The input shaft 46 and the first output shaft 47 may be concentric shafts. The electric vehicle transmission 30 additionally includes a gear reduction assembly 50 disposed in the housing interior 34. The gear reduction assembly 50 is rotatably coupled to the input shaft 46 for delivering rotational torque to wheels of the vehicle.

The housing 32 defines a first sump 36 for retaining oil and a second sump 38 separate from the first sump 36 for retaining oil. The housing 32 housing may include a housing protrusion 56 extending into the second sump 38 for further defining the second sump 38. The second sump 38 and the first sump 36 are configured such that oil lubricates the gear reduction assembly 50 when flowing from the second sump 38 into the first sump 36. Having the second sump 38 and the first sump 36 configured such that oil lubricates the gear reduction assembly 50 when flowing from the second sump 38 into the first sump 36 allows the electric vehicle transmission 30 to have a smaller pump to lubricating the electric motor 40, as described in further detail below. Additionally, having the second sump 38 and the first sump 36 configured such that oil lubricates the gear reduction assembly 50 when flowing from the second sump 38 into the first sump 36 allows the lubrication of the gear reduction assembly 50 to be dependent on rotational speed of components of the electric vehicle transmission 30, as described in further detail below.

In one embodiment, the second sump 38 and the first sump 36 are configured to passively control oil from flowing from the second sump 38 and the first sump 36. In other words, the electric vehicle transmission 30 may be free of a valve, such as a solenoid valve, for actively controlling oil from flowing between the second sump 38 and the first sump 36. Typically, the oil flows from the second sump 38 to the first sump 36 by way of gravity. To control the amount of oil flowing from the second sump 38 to the first sump 36, an oil passageway 58 may be defined between the second sump 38 and the first sump 36, with the flow area of the oil passageway 58 being sized based on the desired amount of flow of oil from the second sump 38 to the first sump 36. Typically, the amount of oil that flows through the oil passageway 58 is less than the amount of oil that is bailed from the first sump 36 to the second sump 38. Alternatively, the electric vehicle transmission 30 may include a valve 60, such as a solenoid valve, disposed between the second sump 38 and said first sump to actively control oil from flowing between the second sump 38 and the first sump 36.

The gear reduction assembly 50 may be further defined as a planetary gear set 62. The planetary gear set 62 may include a plurality of pinion gears 64 disposed about the shaft axis SA. The plurality of pinion gears 64 may be defined as three pinion gears 64 and may be radially separated by 120 degrees from one another about the shaft axis SA.

The electric vehicle transmission 30 may include a carrier 66, such as a disc, coupled to the gear reduction assembly 50. When present, the carrier 66 is configured to bail (i.e., deliver) oil from the first sump 36 to the second sump 38 during rotation of the gear reduction assembly 50. In one embodiment, the carrier 66 has a circular configuration. The carrier 66 may have a first carrier surface 68 facing a first direction with respect to the shaft axis SA, and a second carrier surface 70 facing a second direction opposite the first direction with respect to the shaft axis SA. The first and second carrier surfaces 68, 70 may have a flat configuration. Having a flat configuration allows the carrier 66 to rotate through the oil in the first sump with minimal drag losses, all while still allowing oil to dispose on the first and second carrier surfaces 68, 70 and to be delivered to the second sump 38 due to rotation of the carrier 66. The first and second carrier surfaces 68, 70 may be parallel to one another. It is to be appreciated that the first and second carrier surfaces 68, 70 may have elevations and/or indentations for aiding in the bailing of oil from the first sump 36 to the second sump 38 during rotation of the carrier 66. Whether the first and second carrier surfaces 68, 70 are flat, or have indentations and/or elevations, is dependent balancing the desire for reduced drag of the carrier 66 through the oil in the first sump 36 against the amount of oil that needs to be bailed from the first sump 36 to the second sump 38.

The pinion gears 64 may define a pinion diameter PD. The carrier 66 may define a carrier diameter CD. Typically, the carrier diameter CD is greater than the pinion diameter PD. It is to be appreciated that the carrier 66 may have an increased diameter portion to further allow the carrier 66 to enter the oil disposed in the first sump 36 to then bail the oil into the second sump 38 during rotation of the carrier 66. In addition to be configured to bail the oil from the first sump 36 to the second sump 38, the carrier 66 also provides additional support to the pinion gears 64 such that deflection of components of the electric vehicle transmission 30, in particular the gear reduction assembly 50, is reduced. To this end, when the carrier 66 is present, the carrier 66 is able to move oil from the first sump 36 to the second sump 38 and reduce spin losses of the electric vehicle transmission 30.

Figure 10:
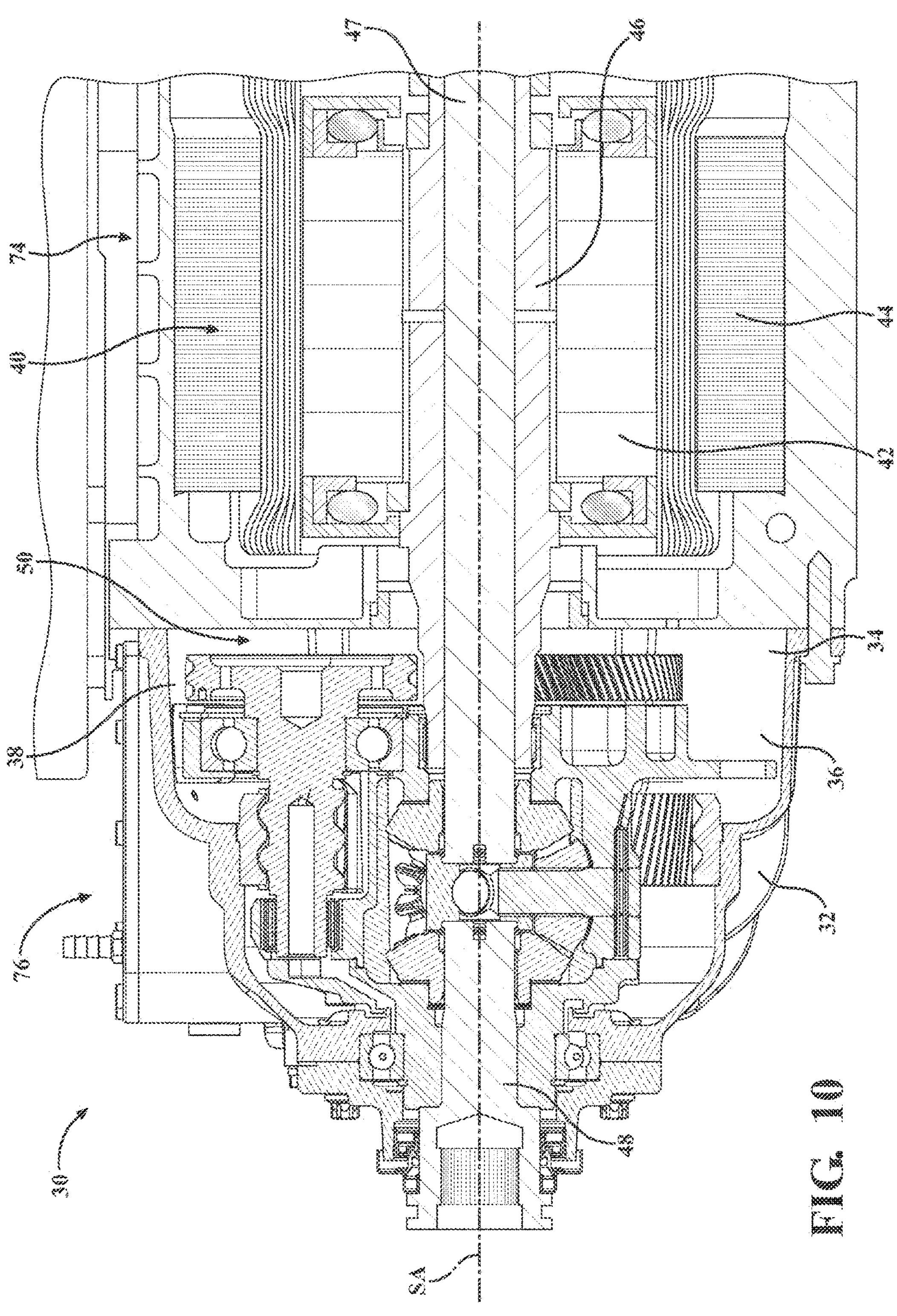
FIG. 10 is a cross-sectional view of the electric vehicle transmission, with the housing interior having an electric motor side and a gear reduction side.
Figure 11:
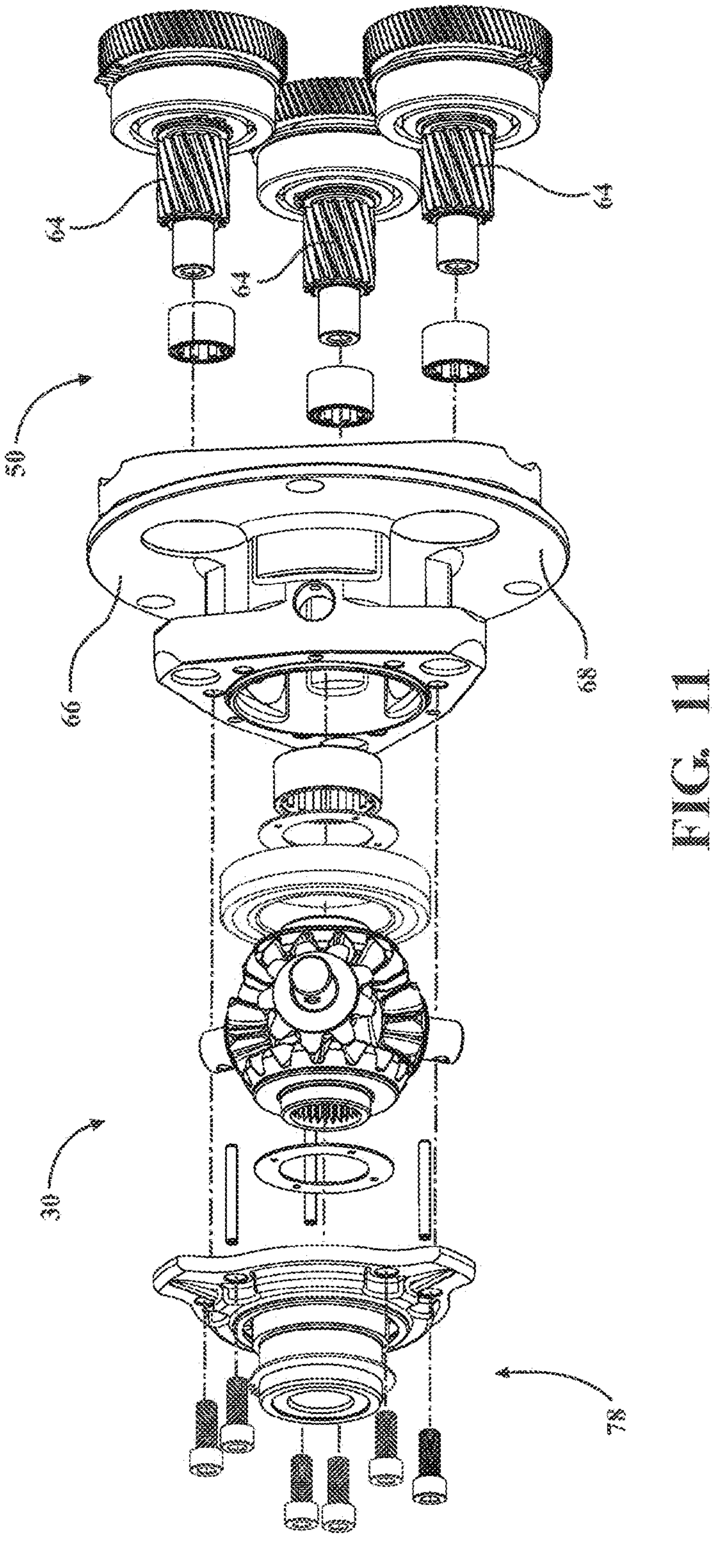
FIG. 11 is an exploded perspective view of the gear reduction assembly.

The housing interior 34 may be divided into an electric motor side 74 and a gear reduction side 76, as best shown in FIG. 10. Typically, the electric vehicle transmission 30 includes a pump for circulating oil in the electric motor side 74 of the housing interior 34. The electric vehicle transmission 30 may be free of a pump for circulating oil in the gear reduction side 76 of the housing interior 34. Due to the requirement to cool the electric motor 40, the electric motor side 74 of the housing interior 34 typically requires a higher flow and circulation of oil to cool the electric motor 40. The pump circulates the oil and cools the oil through a heat exchanger of the electric vehicle transmission 30. When the carrier 66 is present, the gear reduction side 76 of the housing interior 34 typically does not require a pump due to the carrier 66 bailing oil from the first sump 36, to the second sump 38, and allowing gravity to draw oil from the second sump 38 toward the first sump 36 and lubricating the gear reduction assembly 50. To help with directing the oil throughout the gear reduction assembly 50 and to other components of the electric vehicle transmission 30, the electric vehicle transmission 30 may include an oil distribution assembly 78 disposed in the housing interior 34. Typically, the oil distribution assembly 78 is disposed between the second sump 38 and the first sump 36 such that oil flows from the second sump 38, to the oil distribution assembly 78, and to the first sump 36 after the oil lubricates the gear reduction assembly 50 and other components of the electric vehicle transmission 30, such as bearings, gears, and bushings.

To balance the amount of oil in the electric motor side 74 and the gear reduction side 76 of the housing interior, the housing 32 in the second sump 38 may define an upper overfill bleed orifice 80 for allowing oil to flow between the electric motor side 74 and the gear reduction side 76. Similarly, the housing 32 in the first sump 36 may define a lower overfill bleed orifice 82 for allowing oil to flow between the electric motor side 74 and the gear reduction side 76.

Embodiment 1: An electric vehicle transmission for a vehicle, comprising:

a housing defining a housing interior;

an electric motor disposed in said housing interior, wherein said electric motor comprises a rotor and a stator;

an input shaft disposed in said housing interior and extending along a shaft axis, wherein said input shaft is rotatably coupled to said rotor of said electric motor;

a gear reduction assembly disposed in said housing interior, wherein said gear reduction assembly is rotatably coupled to said input shaft for delivering rotational torque to wheels of the vehicle;

wherein said housing defines a first sump for retaining oil and a second sump separate from said first sump for retaining oil;

wherein said second sump and said first sump are configured such that oil lubricates said gear reduction assembly when flowing from said second sump into said first sump.

Embodiment 2: The electric vehicle transmission as set forth in embodiment 1, wherein said second sump and said first sump are configured to passively control oil from flowing between said second sump and said first sump.

Embodiment 3: The electric vehicle transmission as set forth in embodiment 1 further comprising a valve disposed between said second sump and said first sump to actively control oil from flowing between said second sump and said first sump.

Embodiment 4: The electric vehicle transmission as set forth in any one of the preceding embodiments, wherein said gear reduction assembly is further defined as a planetary gear set.

Embodiment 5: The electric vehicle transmission as set forth in embodiment 4, wherein said planetary gearset comprises a plurality of pinion gears disposed about said shaft axis.

Embodiment 6: The electric vehicle transmission as set forth in embodiment 5, wherein said plurality of pinion gears is further defined as three pinion gears.

Embodiment 7: The electric vehicle transmission as set forth in embodiment 6, wherein said three pinion gears are radially separated by 120 degrees from one another about said shaft axis.

Embodiment 8: The electric vehicle transmission as set forth in any one of the preceding embodiments further comprising a carrier coupled to said gear reduction assembly, wherein said carrier is configured to bail oil from said first sump to said second sump during rotation of said gear reduction assembly.

Embodiment 9: The electric vehicle transmission as set forth in embodiment 8, wherein said carrier has a circular configuration.

Embodiment 10: The electric vehicle transmission as set forth in any one of embodiments 8 and 9, wherein said carrier has a first carrier surface facing a first direction with respect to said shaft axis, and a second carrier surface facing a second direction opposite said first direction with respect to said shaft axis, wherein said first and second carrier surfaces have a flat configuration.

Embodiment 11: The electric vehicle transmission as set forth in any one of embodiments 8 and 9, wherein said carrier has a first carrier surface facing a first direction with respect to said shaft axis, and a second carrier surface facing a second direction opposite said first direction with respect to said shaft axis, wherein said first and second carrier surfaces have elevations and/or indentations.

Embodiment 12: The electric vehicle transmission as set forth in any one of embodiments 8 and 9, wherein said carrier has a first carrier surface facing a first direction with respect to said shaft axis, and a second carrier surface facing a second direction opposite said first direction with respect to said shaft axis, wherein at least one of said first and second carrier surfaces have elevations and/or indentations for aiding in the bailing of oil from said first sump to said second sump during rotation of said carrier.

Embodiment 13: The electric vehicle transmission as set forth in any one of the preceding embodiments, wherein said housing comprises a housing protrusion extending into said second sump for further defining said second sump.

Embodiment 14: The electric vehicle transmission as set forth in any one of the preceding embodiments, wherein said housing interior is divided into an electric motor side and a gear reduction side.

Embodiment 15: The electric vehicle transmission as set forth in embodiment 14, wherein said housing in said second sump defines an upper overfill bleed orifice for allowing oil to flow between said electric motor side and said gear reduction side.

Embodiment 16: The electric vehicle transmission as set forth in any one of embodiments 14 and 15, wherein said housing in said first sump defines a lower overfill bleed orifice for allowing oil to flow between said electric motor side and said gear reduction side.

Embodiment 17: The electric vehicle transmission as set forth in any one of embodiments 14-16 further comprising a pump for circulating oil in said electric motor side of said housing interior.

Embodiment 18: The electric vehicle transmission as set forth in any one of embodiments 14-17 being free of a pump for circulating oil in said gear reduction side of said housing interior.

Embodiment 19: The electric vehicle transmission as set forth in any one of the preceding embodiments further comprising an oil distribution assembly disposed in said housing interior.

Embodiment 20: The electric vehicle transmission as set forth in embodiment 19, wherein said oil distribution assembly is disposed between said second sump and said first sump such that oil flows from said second pump, to said oil distribution assembly, and to said first sump after the oil lubricates the gear reduction assembly.

What is claimed is:

1. An electric vehicle transmission for a vehicle, comprising:

a housing defining a housing interior;

an electric motor disposed in said housing interior, wherein said electric motor comprises a rotor and a stator;

an input shaft disposed in said housing interior and extending along a shaft axis, wherein said input shaft is rotatably coupled to said rotor of said electric motor; and a gear reduction assembly disposed in said housing interior, wherein said gear reduction assembly is rotatably coupled to said input shaft for delivering rotational torque to wheels of the vehicle;

wherein said housing defines a first sump for retaining oil and a second sump separate from said first sump for retaining oil;

wherein said second sump and said first sump are configured such that oil lubricates said gear reduction assembly when flowing from said second sump into said first sump;

wherein said housing interior is divided into an electric motor side and a gear reduction side;

wherein said housing in said second sump defines an upper overfill bleed orifice for allowing oil to flow between said electric motor side and said gear reduction side;

wherein said electric vehicle transmission further comprises a carrier coupled to said gear reduction assembly, and wherein said carrier is configured to bail oil from said first sump to said second sump during rotation of said gear reduction assembly; and wherein said electric vehicle transmission further comprises an oil distribution assembly disposed in said housing interior.

2. The electric vehicle transmission as set forth in claim 1, wherein said second sump and said first sump are configured to passively control oil from flowing between said second sump and said first sump.

3. The electric vehicle transmission as set forth in claim 1 further comprising a valve disposed between said second sump and said first sump to actively control oil from flowing between said second sump and said first sump.

4. The electric vehicle transmission as set forth in claim 1, wherein said gear reduction assembly is further defined as a planetary gear set.

5. The electric vehicle transmission as set forth in claim 4, wherein said planetary gearset comprises a plurality of pinion gears disposed about said shaft axis.

6. The electric vehicle transmission as set forth in claim 5, wherein said plurality of pinion gears is further defined as three pinion gears.

7. The electric vehicle transmission as set forth in claim 1, wherein said carrier has a circular configuration.

8. The electric vehicle transmission as set forth in claim 1, wherein said carrier has a first carrier surface facing a first direction with respect to said shaft axis, and a second carrier surface facing a second direction opposite said first direction with respect to said shaft axis, wherein said first and second carrier surfaces have a flat configuration.

9. The electric vehicle transmission as set forth in claim 1, wherein said carrier has a first carrier surface facing a first direction with respect to said shaft axis, and a second carrier surface facing a second direction opposite said first direction with respect to said shaft axis, wherein said first and second carrier surfaces have elevations and/or indentations.

10. The electric vehicle transmission as set forth in claim 1, wherein said carrier has a first carrier surface facing a first direction with respect to said shaft axis, and a second carrier surface facing a second direction opposite said first direction with respect to said shaft axis, wherein at least one of said first and second carrier surfaces have elevations and/or indentations for aiding in the bailing of oil from said first sump to said second sump during rotation of said carrier.

11. The electric vehicle transmission as set forth in claim 1, wherein said housing comprises a housing protrusion extending into said second sump for further defining said second sump.

12. The electric vehicle transmission as set forth in claim 1, wherein said housing in said first sump defines a lower overfill bleed orifice for allowing oil to flow between said electric motor side and said gear reduction side.

13. The electric vehicle transmission as set forth in claim 1 further comprising a pump for circulating oil in said electric motor side of said housing interior.

14. The electric vehicle transmission as set forth in claim 1 being free of a pump for circulating oil in said gear reduction side of said housing interior.

15. The electric vehicle transmission as set forth in claim 1, wherein said oil distribution assembly is disposed between said second sump and said first sump such that oil flows from said second sump, to said oil distribution assembly, and to said first sump after the oil lubricates the gear reduction assembly.

16. An electric vehicle transmission for a vehicle, comprising:

a housing defining a housing interior;

an electric motor disposed in said housing interior, wherein said electric motor comprises a rotor and a stator;

an input shaft disposed in said housing interior and extending along a shaft axis, wherein said input shaft is rotatably coupled to said rotor of said electric motor; and a gear reduction assembly disposed in said housing interior, wherein said gear reduction assembly is rotatably coupled to said input shaft for delivering rotational torque to wheels of the vehicle;

wherein said housing defines a first sump for retaining oil and a second sump separate from said first sump for retaining oil;

wherein said second sump and said first sump are configured such that oil lubricates said gear reduction assembly when flowing from said second sump into said first sump;

wherein said housing interior is divided into an electric motor side and a gear reduction side;

wherein said housing in said second sump defines an upper overfill bleed orifice for allowing oil to flow between said electric motor side and said gear reduction side;

wherein said electric vehicle transmission further comprises a carrier coupled to said gear reduction assembly, and wherein said carrier is configured to bail oil from said first sump to said second sump during rotation of said gear reduction assembly; and wherein said gear reduction assembly is further defined as a planetary gear set comprising a plurality of pinion gears disposed about said shaft axis.

17. The electric vehicle transmission as set forth in claim 16, wherein said plurality of pinion gears is further defined as three pinion gears.

18. The electric vehicle transmission as set forth in claim 17, wherein said three pinion gears are radially separated by 120 degrees from one another about said shaft axis.

19. An electric vehicle transmission for a vehicle, comprising:

a housing defining a housing interior;

an electric motor disposed in said housing interior, wherein said electric motor comprises a rotor and a stator;

an input shaft disposed in said housing interior and extending along a shaft axis, wherein said input shaft is rotatably coupled to said rotor of said electric motor; and a gear reduction assembly disposed in said housing interior, wherein said gear reduction assembly is rotatably coupled to said input shaft for delivering rotational torque to wheels of the vehicle;

wherein said housing defines a first sump for retaining oil and a second sump separate from said first sump for retaining oil;

wherein said second sump and said first sump are configured such that oil lubricates said gear reduction assembly when flowing from said second sump into said first sump;

wherein said housing interior is divided into an electric motor side and a gear reduction side;

wherein said housing in said second sump defines an upper overfill bleed orifice for allowing oil to flow between said electric motor side and said gear reduction side;

wherein said electric vehicle transmission further comprises a carrier coupled to said gear reduction assembly, and wherein said carrier is configured to bail oil from said first sump to said second sump during rotation of said gear reduction assembly; and wherein said electric vehicle transmission is free of a pump for circulating oil in said electric motor side of said housing interior.

20. The electric vehicle transmission as set forth in claim 19 further comprising an oil distribution assembly disposed in said housing interior, wherein said oil distribution assembly is disposed between said second sump and said first sump such that oil flows from said second sump, to said oil distribution assembly, and to said first sump after the oil lubricates the gear reduction assembly.

* * * * *